ed Oct. 7, 1958

2,855,375

PLASTICIZED VINYLIDENE CYANIDE POLYMERS

Donald Gene Dobay, Brecksville, Ohio, assignor to The B. F. Goodrich Company, New York, N. Y., a corporation of New York No Drawing. Application August 30, 1955
Serial No. 531,592

8 Claims. (Cl. 260—30.8)

This invention relates to novel compositions of matter comprising a polymer of vinylidene cyanide plasticized with an organic sulfonamide, and more particularly relates to strong, flexible films made of an interpolymer of vinylidene cyanide with a vinyl or vinylidene compound which copolymer has been plasticized with an amide of an aromatic sulfonic acid.

U. S. Patents 2,476,270, 2,502,412 and 2,414,387 disclose the preparation of monomeric vinylidene cyanide, also named 1,1-dicyano ethylene, which is a clear liquid at room temperature and a crystalline solid at 0° C., possessing a melting point when in purest form of about 9.7° C., and which undergoes on contact with water an instantaneous homopolymerization reaction to give a solid, water-insoluble resin. On copolymerization of this monomer in mass or in anhydrous organic medium with various other polymerizable materials, there are obtained resinous copolymers which are extremely useful in the preparation of filaments, films and shaped articles possessing many valuable properties including high tensile strength, low elongation and excellent resistance to the action of chemicals and the weather.

It has been found, however, that vinylidene cyanide polymers and interpolymers are extremely difficult to process by normal mixing, milling or calendering operations to form sheets, films and the like. Moreover, such polymers rapidly degrade when heated to temperatures at which they soften or melt. Reduction of melt viscosity of vinylidene cyanide interpolymers by the addition of a plasticizer thereto has heretofore been unsuccessful since most commercially available plasticizers are incompatible with vinylidene cyanide interpolymers.

It is an object of this invention to prepare plasticized compositions comprising a vinylidene cyanide polymer or interpolymer and a plasticizer compatible with the polymer at elevated and reduced temperatures. It is another object of this invention to prepare vinylidene cyanide polymers containing a plasticizer which reduces the melt viscosity of the polymer at elevated temperatures. Still another object of this invention is to prepare flexible films, sheets and the like comprising plasticized vinylidene cyanide polymers. Other objects will be apparent from the following disclosure.

It has now been discovered that the above objects are readily attained by incorporating with a vinylidene cyanide polymer, as a plasticizer therefor, an organic sulfonamide.

In accordance with this invention there may be employed as a plasticizer for vinylidene cyanide polymers and interpolymers any organic sulfonamide containing from 1 to 20 carbon atoms and having no more than 10 carbon atoms in the sulfonic acid residue. Sulfonamides of this class include those possessing the following formulae:

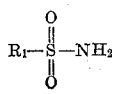

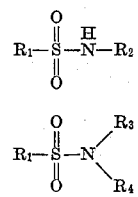

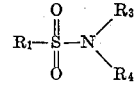

wherein $R_1$ represents a monovalent organic radical containing from 1 to 10 carbon atoms and having its connecting valence on carbon, $R_2$ likewise represents such a radical and $R_3$ and $R_4$ represent individual monovalent organic radicals or taken together represent a divalent organic radical, with connecting valence on carbon, and with the sum of carbon atoms in $R_3$ and $R_4$ being from 2 to 10.

The $R_1$ organic radical may be aliphatic, cycloaliphatic or aromatic in nature and may be composed entirely of carbon and hydrogen atoms, or it may have one or more of the hydrogen atoms substituted by substituent atoms or groups including chlorine, bromine, nitro, mercapto, cyano, carboxyl, hydroxyl, oxo and amino, or it may also be a heterocyclic radical in which event the hetero atom or atoms may be oxygen, sulfur and nitrogen. When $R_1$ is aliphatic the sulfonamide is an aliphatic sulfonamide, when $R_1$ is cycloaliphatic the sulfonamide is a cycloaliphatic sulfonamide and when $R_1$ is aromatic the sulfonamide is an aromatic sulfonamide. The aromatic sulfonamides are preferred, particularly those in which $R_1$ is an aryl hydrocarbon group.

The —$NH_2$

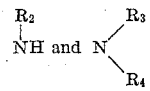

radicals may be considered as derived by removal of hydrogen from ammonia or a primary or secondary amine. Consequently, $R_2$, $R_3$ and $R_4$ may be hydrocarbon such as alkyl, cycloalkyl or aryl or substituted hydrocarbon (for example having substituents as indicated above for $R_1$) or $R_3$ and $R_4$ taken together may be the residue of a heterocyclic secondary amine such as morpholine or piperidine.

Typical examples of aliphatic sulfonamides include methylsulfonamide; ethylsulfonamide; n-propylsulfonamide; secondary propylsulfonamide; n-butylsulfonamide; amylsulfonamide; hexylsulfonamide; octylsulfonamide; decylsulfonamide; N-methyl methylsulfonamide; N,N-dimethyl ethylsulfonamide; N-ethyl butylsulfonamide; N,N-diamyl ethylsulfonamide; N-decyl ethylsulfonamide; N,N-diisopropyl hexylsulfonamide; N,N-dibutyl amylsulfonamide; N-cyclohexyl ethylsulfonamide; N,N-dimethyl cyclohexyl ethylsulfonamide; dimethanesulfonamide; diethanesulfonamide; dibutanesulfonamide and the like; as well as substituted aliphatic sulfonamides such as 2-chloroethylsulfonamide; 2-bromoethylsulfonamide; 3-nitropropylsulfonamide; 4-amino butylsulfonamide; N-ethyl 5-mercaptoamylsulfonamide; N,N-bis (carboxyethyl)-propylsulfonamide; N,N-bis(cyanobutyl) butylsulfonamide; N-methylsulfonylmorpholine; N-butylsulfonyl thiamorpholine; N-ethylsulfonyl piperazine; N,N-bis(diamylsulfonyl)piperazine and the like.

Examples of cycloaliphatic sulfonamides include cyclopentylsulfonamide; cyclohexylsulfonamide; cycloheptylsulfonamide; hexahydronaphthylsulfonamide; N-ethyl cyclohexylsulfonamide; N,N-diisopropyl cyclohexylsulfonamide; dicyclohexanesulfonamide; N-cyclohexylsulfonyl morpholine; N-cycloheptylsulfonyl thiamorpholine; N-hexahydronaphthylsulfonyl piperazine and the like; as well as substituted cycloaliphatic sulfonamides such as 4-methyl cyclohexylsulfonamide; 4-butyl cyclohexylsulfonamide; 4-chlorocyclohexylsulfonamide; N-cyanoethyl cyclohexylsulfonamide; N,N-bis(aminoethyl) 4-nitro cyclohexylsulfonamide; N-amino cyclohexylsulfonyl piperazine; N,N-bis(aminobutyl)hexahydronaphthylsulfonamide and the like.

Examples of aromatic sulfonamides include benzenesulfonamide; N-methyl benzenesulfonamide; N-amyl benzenesulfonamide; N-decyl benzenesulfonamide; N,N-dimethyl benzenesulfonamide; N,N-diamyl benzenesulfonamide; N,N-dicyanoethyl benzenesulfonamide; benzenesulfonyl morpholine; N-naphthylsulfonyl pyrrolidine; o-, m- and p-toluenesulfonamide; p-nitrobenzenesulfonamide; p-hydroxybenzenesulfonamide; o-, m- and p-aminobenzenesulfonamide; N-ethyl o- and p-toluenesulfonamide; N,N-dimethyl p-toluenesulfonamide; N-heptyl p-toluenesulfonamide; N,N-diamyl p-toluenesulfonamide; N,N-bis(carboxyethyl) o- and p-toluenesulfonamide; N,N-bis(cyanobutyl) p-chlorobenzenesulfonamide; N-methylcyclohexyl p-hydroxybenzenesulfonamide; N-p-toluenesulfonyl pyrrolidine; N-nitrobenzenesulfonyl morpholine and the like.

Examples of heterocyclic sulfonamides include 2-thiophenesulfonamide; 2-pyrrolesulfonamide; 2-furansulfonamide; 2-alpha, beta and gamma-pyridinesulfonamide; N-(2-thiophenesulfonyl) pyrrolidine; N-(2-furansulfonyl) morpholine; di-2-pyrrolesulfonamide; N,N-diethyl 2-thiophenesulfonamide; N,N-methyl cyclohexyl 2-furansulfonamide; N-amyl alpha-pyridinesulfonamide and the like.

In general the nature of the sulfonamide is not critical except that group X in

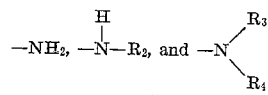

must be selected from the class consisting of

wherein

represents a radical derived by removing one amino hydrogen from a primary amine and $R_2$ represents a hydrocarbon radical of 1 to 10 carbon atoms and

represents a radical derived by removing the amino hydrogen from a secondary amine of the class consisting of morpholine, piperidine, and secondary amines of the formula

wherein each $R_3$ and $R_4$ is selected from the class consisting of alkyl, carboxyalkyl and cyanoalkyl, and the sum of the carbon atoms in $R_3$ and $R_4$ is from 2 to 10.

The vinylidene cyanide polymers which form useful plasticized compositions when incorporated with organic sulfonamides in accordance with this invention include homopolymeric vinylidene cyanide and, more preferably, any interpolymer of vinylidene cyanide with any other olefinic monomer copolymerizable therewith. The nature of the olefinic monomers copolymerized with the vinylidene cyanide is not critical; however, the most useful interpolymers are those made up of about 50 mole percent vinylidene cyanide and about 50 mole percent of a monoolefinic monomer which copolymerizes with vinylidene cyanide to form an essentially 1 to 1 (or 50 mole percent) alternating copolymer.

Among the monoolefinic compounds which form the essentially 1 to 1 alternating copolymers with vinylidene cyanide are included, by way of example, the following classes of compounds:

(1) Vinyl esters of aliphatic monocarboxylic acids, preferably of the structure RCOOH, wherein R is alkyl, such as vinyl acetate, vinyl propionate, vinyl butyrate, vinyl isobutyrate, vinyl valerate, vinyl caproate, vinyl enanthate and the like. The copolymerization with vinylidene cyanide of such copolymerizable monomers and the resulting copolymers are described more fully in U. S. Patent 2,615,866. Mixtures of these two-component copolymers with aromatic sulfonic acid amides form a particularly preferred class of compositions within the scope of this invention;

(2) Vinyl esters of the structure

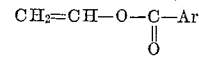

where Ar is an aromatic radical in which all the hydrogen atoms are attached to carbon atoms, such as vinyl benzoate, homologues of vinyl benzoate, for example, vinyl toluate and the like, monomers of the above general class, wherein the aromatic radical is halogen substituted, such as vinyl p-chlorobenzoate, vinyl o-chlorobenzoate, vinyl m-chlorobenzoate, and similar vinyl halo-benzoates and monomers of the above general class wherein the aromatic radical is alkoxy substituted, for example, vinyl p-methoxybenzoate, vinyl o-methoxybenzoate and vinyl p-ethoxybenzoate. The copolymerization with vinylidene cyanide of such monomers, and the resulting copolymers are disclosed in U. S. Patent 2,615,867;

(3) Styrene and substituted styrenes of the general formula

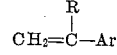

wherein Ar is an aromatic radical in which all of the hydrogen atoms are attached to carbon atoms and R is a member of the class consisting of hydrogen atoms and alkyl radicals, preferably those which contain from 1 to 4 carbon atoms, such as styrene itself, and substituted styrenes such as alpha-methyl styrene, alpha-ethyl styrene, alpha-butyl styrene, alpha-chlorostyrene, alpha-bromostyrene, 2,5-dichlorostyrene, 2,5-dibromostyrene, ortho-, meta-, and para-methoxystyrene, para-alpha-dimethyl styrene, para-methyl styrene, 3,4-dichlorostyrene, 3,4-difluorostyrene, 2,4-dichlorostyrene, 2,4,5-trichlorostyrene, dichloro-mono-fluorostyrenes and the like. Copolymerization of vinylidene cyanide with styrene and substituted styrenes is disclosed in U. S. Patent 2,615,868;

(4) Olefins such as propylene, isobutylene, (2-methyl propene-1), 2-methylbutene-1, 2-methylpentene-1, 2,3-dimethylbutene-1, 2,3-dimethylpentene-1, 2,3,3-trimethylbutene-1, 2,3,4-trimethylpentene-1, 2,6-dimethyloctene-1, 2-methylnonadecene-1, and the like. Copolymerization of such olefins with vinylene cyanide is disclosed in U. S. Patents 2,515,865 and 2,615,874;

(5) Alkyl esters of methacrylic acid which possess the structure

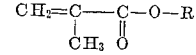

wherein R is an alkyl radical, preferably containing from 1 to 8 carbon atoms, for example, methyl methacrylate, ethyl methacrylate, propyl methacrylate, butyl methacrylate, amyl methacrylate, hexyl methacrylate, heptyl methacrylate, octyl methacrylate, decyl methacrylate, and the like. Vinylidene cyanide alkyl methacrylate copolymers and their preparation are disclosed in U. S. Patent 2,615,871;

(6) Halogenated olefins such as vinyl chloride, vinylidene chloride and 2-chloropropene. Copolymerization of these compounds with vinylidene cyanide is disclosed in U. S. Patents 2,615,869, 2,615,870 and 2,615,877;

(7) Isopropenyl esters of organic monocarboxylic acids, preferably of the formula RCOOH, wherein R is an alkyl radical containing from 1 to 6 carbon atoms, and including isopropenyl acetate, isopropenyl propionate, isopropenyl isobutyrate, isopropenyl valerate, isopropenyl caproate, and isopropenyl enanthate; as well as isopropenyl esters of aromatic carboxylic acids, for example, isopropenyl benzoate, isopropenyl p-chlorobenzoate, isopropenyl o-chlorobenzoate, isopropenyl m-chlorobenzoate, isopropenyl toluate, isopropenyl alpha-chloroacetate, isopropenyl alpha-bromopropionate, and the like; the copolymerization of all of which with vinylidene cyanide is described in U. S. Patent 2,615,875;

(8) Vinyl esters of alpha-halo saturated aliphatic monocarboxylic acids of the structure

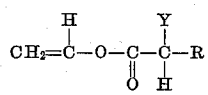

wherein R is a member of the class consisting of hydrogen and an alkyl radical, preferably a lower alkyl radical, and Y is a halogen atom, such as vinyl alpha-chloroacetate, vinyl alpha-bromoacetate, vinyl alpha-chloropropionate, vinyl alpha-bromopropionate, vinyl alpha-iodopropionate, vinyl alpha-bromovalerate and the like. The copolymerization of such monomers with vinylidene cyanide is described in U. S. Patent 2,615,876.

Still other interpolymers of vinylidene cyanide which may be plasticized in accordance with this invention are disclosed in U. S. Patents 2,615,865 to 2,615,880, 2,628,-954, 2,650,911, 2,654,728, 2,654,729, 2,657,197 and copending applications Serial Nos. 268,461, 268,462 and 268,463 all filed January 26, 1952 now patents 2,716,104 through 2,716,106 respectively; 402,823 filed January 7, 1954 now patent 2,786,046; and 407,595 filed February 1, 1954 and now abandoned, the disclosures of all of which are incorporated herein by reference.

The incorporation of the plasticizers of this invention into vinylidene cyanide polymer or interpolymer compositions can be carried out by any of several different techniques. One method applicable when the plasticizer is a liquid consists of adding the liquid plasticizers to powdered vinylidene cyanide interpolymer to form a slurry and mastication of said slurry by suitable mechanical means, such as milling, calendering or blending with rotary beaters. Another method of incorporating or preparing plasticized vinylidene cyanide compositions consists in dissolving both the polymeric material and the plasticizer in a mutual solvent and spreading a film of the solution on a surface from which the solvent is evaporated.

When plasticizing the polymers by mastication, temperatures of about 50° C. less than the softening point of the particular vinylidene cyanide interpolymer are generally sufficient. However, as the plasticizer content or proportions are increased, the temperature required to blend the plasticizer uniformly with the interpolymer is lowered. In carrying out plasticization by dissolving both the plasticizer and the interpolymer in a mutual solvent, it is desired that the combined plasticizer and interpolymer concentration be less than 25 percent by weight of the total solution. Mutual solvents which will dissolve both the esters and many interpolymers are the following: dimethyl formamide and nitro alkanes, preferably the low molecular weight alkanes. The preferred method of preparing plasticized vinylidene cyanide interpolymer compositions according to this invention is mastication by a milling or calendering operation. A suitable range of amount of plasticizer to base resin is from about 5 to 200 parts, preferably 10 to 100 parts, of plasticizer per 100 parts of base resin.

The following examples are intended to illustrate methods of plasticizing vinylidene cyanide interpolymers with sulfonamides, as well as to illustrate the improved characteristics of the resulting plasticized compositions when formed into sheets and films. All parts are by weight unless indicated otherwise.

*Example 1 to 12*

Solutions consisting of 10.0 parts of a 1 to 1 molar copolymer of vinylidene cyanide and vinyl acetate having an intrinsic viscosity of 2.19, 90.0 parts of N,N-dimethylformamide, and representative organic sulfonamides were prepared by adding the particular organic sulfonamide to the dissolved polymer. Films having a wet film thickness of about 0.020 inch were cast from the sulfonamide: polymer:solvent solutions by spreading the solution on a glass plate and drying twenty to twenty-six hours in a circulating hot air oven at 72–75° C. Test pieces, 0.250 inch wide and 2 to 3 inches long were die-cut from the dried films, inserted between rubber lined jaws of an Instron tensile and elongation testing machine, and elongated at a rate of 100 percent per minute to determine the ultimate elongation and tensile strength of the films. The films were also visually evaluated for compatibility of the sulfonamide with the copolymer and graded as clear, cloudy or opaque according to film appearance evidencing no precipitation, little precipitation or substantial precipitation of the particular sulfonamide.

Set out in the following table is the particular organic sulfonamide employed; organic sulfonamide percent by weight based on the copolymer, compatibility of sulfonamide with the film defined as clear, cloudy or opaque, ultimate elongation in percent and ultimate tensile strength in pounds per square inch.

| Example | Sulfonamide | Percent | Compatibility | Tensile, p. s. i. | Elongation, percent |
|---|---|---|---|---|---|
| 1 | N,N-di-n-butyl benzenesulfonamide. | 25.0 | Clear | 7,250 | 36.0 |
| 2 | do | 60.0 | do | 6,580 | 51.0 |
| 3 | N,N-bis(carboxyethyl)benzenesulfonamide. | 25.0 | do | 6,800 | 40.0 |
| 4 | N,N-bis(cyanoethyl)benzenesulfonamide. | 25.0 | do | 9,350 | 29.0 |
| 5 | p-toluenesulfonamide | 20.0 | do | 8,100 | 83.0 |
| 6 | do | 32.3 | do | 5,500 | 48.0 |
| 7 | N-ethyl p-toluenesulfonamide | 25.0 | do | 7,500 | 31.0 |
| 8 | do | 40.0 | do | 5,920 | 92.0 |
| 9 | do | 60.0 | do | 4,520 | 97.0 |
| 10 | do | 80.0 | do | 3,580 | 156.0 |
| 11 | N-ethyl mixed o- and p-toluenesulfonamides. | 40.0 | do | 9,500 | 74.0 |
| 12 | do | 80.0 | do | 7,650 | 44.0 |

*Examples 13 to 17*

A 1 to 1 molar copolymer of vinylidene cyanide and vinyl acetate having an intrinsic viscosity of 2.19, was masticated with representative organic sulfonamides by mixing the polymer and organic sulfonamide on 4 inch two-roll rubber mills. The copolymer:sulfonamide compositions were stripped from the mills as sheets having a thickness of about 0.125 inch. The sheets were observed visually to determine compatibility of the sulfonamides with the copolymer at room temperatures and graded as clear, cloudy or opaque according to the plasticized film's appearance evidencing no precipitation, slight precipitation or substantial precipitation.

Set out in the following table is the particular organic sulfonamide employed, organic sulfonamide percent by weight based on copolymer, mill temperature and compatibility of sulfonamide defined by the terms clear, cloudy and opaque.

| Example | Sulfonamide | Percent | Compatibility | Mill Temperature, °F. |
|---|---|---|---|---|
| 13 | N-phenylsulfonyl morpholine. | 50.0 | Cloudy | 340 |
| 14 | ____do____ | 100.0 | ___do___ | 335 |
| 15 | alpha-toluene sulfonamide | 50.0 | ___do___ | 340 |
| 16 | N-n-butyl p-toluenesulfonamide. | 50.0 | Clear | 340 |
| 17 | p-amino benzosulfonamide. | 50.0 | ___do___ | 340 |

*Examples 18 to 24*

Films containing 10 percent by weight of sulfonamide plasticizer based on the weight of a 1 to 1 molar copolymer of vinylidene cyanide and vinyl acetate were prepared in accordance with the method described in Examples 1 to 12. The films were die-cut 0.250 inch wide, 2 to 3 inches long and elongated at a rate of 100 percent elongation per minute until the samples broke. The films were visually evaluated for compatibility of sulfonamide with the copolymer and graded as clear, cloudy or opaque according to no precipitation, little precipitation or substantial precipitation of plasticizer from the base resin.

Set out in the following table is the particular sulfonamide employed, compatibility of sulfonamide and ultimate elongation of film at break expressed in percent.

| Example | Sulfonamide | Compatibility | Total Elongation, Percent |
|---|---|---|---|
| 18 | N,N-di-n-butyl benzenesulfonamide | Clear | 9.0 |
| 19 | N,N-bis (carboxyethyl) benzenesulfonamide. | ___do___ | 26.0 |
| 20 | N,N-bis (cyanoethyl) benzenesulfonamide. | ___do___ | 11.0 |
| 21 | p-toluenesulfonamide | ___do___ | 10.0 |
| 22 | N-cyclohexyl p-toluenesulfonamide | ___do___ | 43.0 |
| 23 | N-ethyl p-toluenesulfonamide | ___do___ | 20.0 |
| 24 | N-ethyl mixed o- and p-toluenesulfonamides. | ___do___ | 22.0 |

The above examples show that films and sheets are easily prepared of the plasticized vinylidene cyanide/vinyl acetate copolymers of this invention.

The plasticized vinylidene cyanide polymers prepared in accordance with this invention can be further modified by incorporating therewith such ingredients as pigments, heat and light stabilizing agents, fillers and the like.

The foregoing examples and the disclosure embodied herein illustrate the novel plastized vinylidene cyanide polymer compositions of this invention as well as their methods of preparation. Accordingly, it is not intended that this invention be limited to the specific examples, for there are numerous methods which may be employed in the practice of this invention without deviating from the scope of this invention. Therefore, it is intended that this invention shall be limited and defined only in accordance with the appended claims.

I claim:

1. A composition comprising a 1 to 1 molar copolymer of vinylidene cyanide and vinyl acetate, said vinylidene cyanide being a liquid at room temperature and a crystalline solid at 0° C., having a melting point when in purest form of about 9.7° C. and being characterized chemically by the ability to undergo an instantaneous homopolymerization reaction on contact with water at room temperature to give a solid, water-insoluble resin, and, as a plasticizer therefor, an organic sulfonamide of the formula $$R_1-\overset{O}{\underset{O}{\overset{\|}{S}}}-X$$

wherein $R_1$ is selected from the class consisting of aromatic hydrocarbon radicals containing from 6 to 10 carbon atoms and substituted aromatic hydrocarbon radicals containing from 6 to 10 carbon atoms and having hydrogen substituted by a radical of the class consisting of chloro, bromo, nitro, mercapto, cyano, carboxyl, hydroxyl, oxo, and amino, and X is selected from the class consisting of $-NH_2$, $$-\overset{H}{\underset{}{\overset{|}{N}}}-R_2$$

$$-N\diagup^{R_3}_{\diagdown R_4}$$

wherein $$-\overset{H}{\underset{}{\overset{|}{N}}}-R_2$$

represents a radical derived by removing one amino hydrogen from a primary amine and $R_2$ represents a hydrocarbon radical of 1 to 10 carbon atoms and $$-N\diagup^{R_3}_{\diagdown R_4}$$

represents a radical derived by removing the amino hydrogen from a secondary amine of the class consisting of morpholine, piperidine, and secondary amines of the formula $$H-N\diagup^{R_3}_{\diagdown R_4}$$

wherein each $R_3$ and $R_4$ is selected from the class consisting of alkyl, carboxyalkyl and cyanoalkyl, and the sum of the carbon atoms in $R_3$ and $R_4$ is from 2 to 10.

2. A composition comprising a 1 to 1 molar copolymer of vinylidene cyanide and vinyl acetate, said vinylidene cyanide being a liquid at room temperature and a crystalline solid at 0° C., having a melting point when in purest form of about 9.7° C. and being characterized chemically by the ability to undergo an instantaneous homopolymerization reaction on contact with water at room temperature to give a solid, water-insoluble resin, and, as a plasticizer therefor, an organic sulfonamide of the formula $$R_1-\overset{O}{\underset{O}{\overset{\|}{S}}}-NH_2$$

wherein $R_1$ is an aromatic hydrocarbon radical containing from 6 to 10 carbon atoms.

3. A composition according to claim 2 wherein the plasticizer is p-toluene sulfonamide.

4. A composition according to claim 2 wherein the plasticizer is benzene sulfonamide.

5. A composition comprising a 1 to 1 molar copolymer of vinylidene cyanide and vinyl acetate, said vinylidene cyanide being a liquid at room temperature and a crystalline solid at 0° C., having a melting point when in purest form of about 9.7° C. and being characterized chemically by the ability to undergo an instantaneous homopolymerization reaction on contact with water at room temperature to give a solid, water-insoluble resin, and as a plasticizer therefor, an organic sulfonamide of the formula

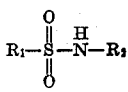

wherein $R_1$ is an aromatic hydrocarbon radical containing from 6 to 10 carbon atoms and

represents a radical derived by removing one amino hydrogen from a primary amine and $R_2$ represents a hydrocarbon radical of 1 to 10 carbon atoms.

6. A composition according to claim 5 wherein the plasticizer is selected from the group consisting of N-ethyl p-toluene sulfonamide and N-ethyl mixed o- and p-toluene sulfonamides.

7. A composition comprising a 1 to 1 molar copolymer of vinylidene cyanide and vinyl acetate, said vinylidene cyanide being a liquid at room temperature and a crystalline solid at 0° C., having a melting point when in purest form of about 9.7° C. and being characterized chemically by the ability to undergo an instantaneous homopolymerization reaction on contact with water at room temperature to give a solid, water-insoluble resin, and as a plasticizer therefor, an organic sulfonamide of the formula

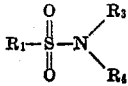

wherein $R_1$ is selected from the class consisting of aromatic hydrocarbon radicals containing from 6 to 10 carbon atoms and

represents a radical derived by removing the amino hydrogen from a secondary amine of the class consisting of morpholine, piperidine, and secondary amines of the formula

wherein each $R_3$ and $R_4$ is selected from the class consisting of alkyl, carboxyalkyl, and cyanoalkyl, and the sum of the carbon atoms in $R_3$ and $R_4$ is from 2 to 10.

8. A composition according to claim 7 wherein the plasticizer is N,N-di-n-butyl benzene sulfonamide.

References Cited in the file of this patent

UNITED STATES PATENTS

| | | |
|---|---|---|
| 2,186,262 | Mitchell | Jan. 9, 1940 |
| 2,466,395 | Dickey | Apr. 5, 1949 |
| 2,524,368 | Sido | Oct. 3, 1950 |